(12) United States Patent
Kishimoto et al.

(10) Patent No.: US 6,506,007 B1
(45) Date of Patent: Jan. 14, 2003

(54) FASTENING BOLT

(75) Inventors: Mitsuharu Kishimoto, Hyogo (JP); Yukihiko Koza, Hyogo (JP); Hiroki Nomoto, Hyogo (JP); Kenichi Yajima, Hyogo (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/979,517

(22) PCT Filed: Jun. 14, 1999

(86) PCT No.: PCT/JP99/03168

§ 371 (c)(1),
(2), (4) Date: Jan. 28, 2002

(87) PCT Pub. No.: WO00/77409

PCT Pub. Date: Dec. 21, 2000

(51) Int. Cl.[7] ............................ F16B 31/00; F16B 35/02
(52) U.S. Cl. ................... 411/14.5; 411/383; 411/396; 411/552; 411/916
(58) Field of Search ......................... 411/14.5, 19, 396, 411/397, 513, 552, 553, 916, 917, 383

(56) References Cited

U.S. PATENT DOCUMENTS

| | | | | | |
|---|---|---|---|---|---|
| 2,334,268 A | * | 11/1943 | Judge | ...................... | 411/513 X |
| 2,465,548 A | * | 3/1949 | Michael | ................... | 411/552 X |
| 3,136,017 A | * | 6/1964 | Preziosi | ....................... | 411/552 |
| 3,564,563 A | * | 2/1971 | Trotter et al. | ............... | 411/552 |
| 3,886,707 A | * | 6/1975 | Heldt | ....................... | 411/14.5 |
| 4,884,934 A | * | 12/1989 | Ikeda et al. | ............. | 411/916 X |
| 5,468,106 A | * | 11/1995 | Percival-Smith | ........ | 411/916 X |
| 5,842,263 A | | 12/1998 | Gosling | ........................ | 29/452 |
| 5,878,490 A | * | 3/1999 | Heinold et al. | ......... | 411/916 X |

FOREIGN PATENT DOCUMENTS

| | | |
|---|---|---|
| JP | 44-419 Y | 1/1969 |
| JP | 63-157407 | 10/1988 |
| JP | 02-262971 | 10/1990 |
| JP | 3-127813 U | 12/1991 |
| JP | 05-079302 | 3/1993 |
| JP | 7-55414 B | 6/1995 |
| JP | 10-318240 A | 12/1998 |

* cited by examiner

Primary Examiner—Neill Wilson
(74) Attorney, Agent, or Firm—Marshall, Gerstein & Borun

(57) ABSTRACT

A fastening bolt fastens flanges between a bolt head and a nut attached on the threaded portion of the shaft via spherical washers. The fastening bolt has a cavity formed within the shaft. By application of pressure in the cavity with a hydraulic fluid supplied through a hydraulic pressure port in a plug, the shaft is extended and the fastening bolt becomes unfastened condition. In the unfastened condition, a gap is created between flange and nut, and the nut and the fastening bolt are free to rotate each other, therefore, the nut can be removed easily by hand from the fastening bolt, even the bolt is large in size. The fastening force is adjustable by the width of the gap before releasing hydraulic pressure in the cavity. By releasing hydraulic pressure in the cavity, the fastened condition is obtained. Conversion between fastened condition and unfastened condition can be made quickly and easily.

10 Claims, 9 Drawing Sheets distance between bolt head and nut distance between bolt head and nut

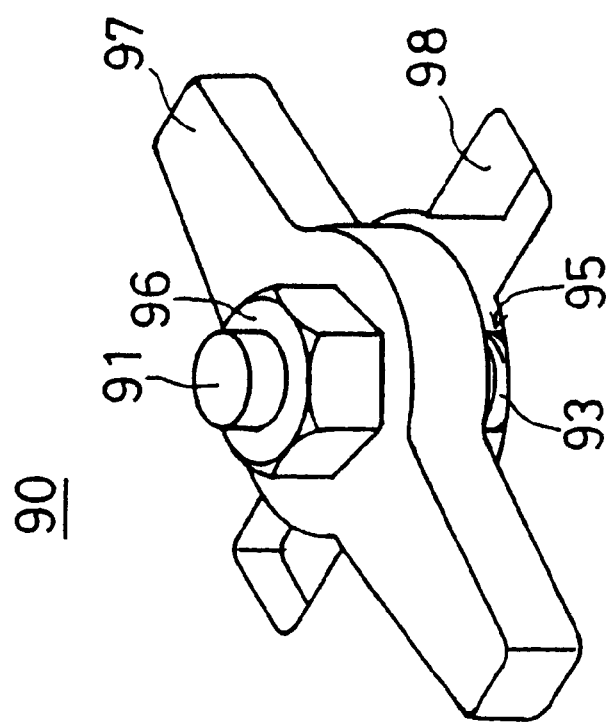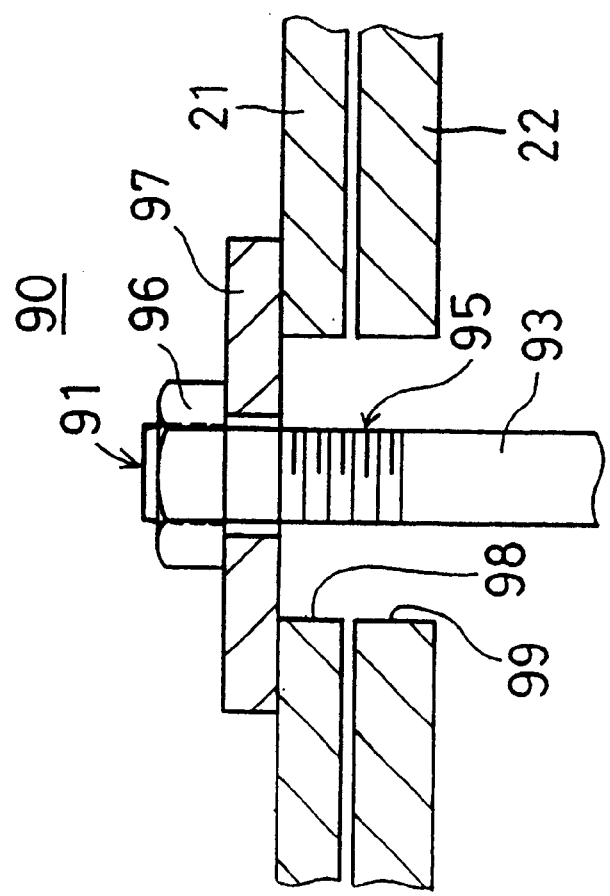

FASTENING BOLT

BACKGROUND ART

Combination of bolt and nut is widely used as a fundamental fastening elements. The bolt has a head portion formed as a larger outer diameter portion at one end of the shaft, and an outer thread formed on the circumference of the shaft for engaging with inner thread of the nut. The objects are fastened between the head portion and the nut, and the fastening force between them is adjusted by tightening the nut, and the fastening length is adjusted by using washer or spacer.

In a smelting reduction plant and the like, it is preferable to make a bottom portion of a reduction furnace separable, because interior of the bottom portion is covered with a firebrick lining which needs periodical repair. This separable construction of the furnace makes the plant more cost effective than to install two furnaces so that one furnace can be repaired while the other furnace is in operation. The smelting furnace in the commercial plant has a large volume, and a large number of fastening bolts are needed for connecting the bottom portion to the furnace body with flanges. Air tightness is required at the flange connecting portion because the smelting reduction furnace is operated under high internal pressure of several kgf/cm2 G, and quick replacement of the bottom portion is also required to prevent drop of plant operating efficiency. When conventional bolts and nuts are used for fastening flanges, a large number of bolts and nuts should be fastened uniformly to keep air tightness, and unfastened for releasing flanges.

FIG. 11 shows a prior art of a bolt disclosed in Japanese Utility Model Laid-Open No. Sho 63-157407, which is fastened utilizing hydraulic pressure. A guide base 1a is secured on a rest bar 3 by fastening a clamp 2, and by unfastening the clamp 2 the rest bar 3 is slidable along the rest bar 3 in the direction perpendicular to the surface of the drawing. A fastening shaft 4 for creating fastening force is inserted into a piston 5 combined with a cylinder 8. When the hydraulic pressure is applied to create a hydraulic space 6 at the abutted portion of piston 5 and cylinder 8, a lock nut 7 attached on the end of the shaft 4 is pushed apart by the piston 5 in the axial direction of the shaft 4. A reaction force of the piston 5 against the lock nut 7 is applied on the clamp 2 by the cylinder 8.

Upper half of FIG. 11 shows the condition when no hydraulic pressure is applied. In this condition, the end surface of the cylinder 8 is fastened by a fastening nut 9 attached on the circumference of the piston 5. When the hydraulic pressure is applied to create hydraulic pressurizing space 6 between the abutted portions of the piston 5 and the cylinder 8, as shown in lower half of the FIG. 11, the piston 5 is moved in the direction away from the head portion of the fastening shaft 4, and a gap G is formed between end surfaces of the cylinder 8 and the fastening nut 9. Under such condition, the lock nut 7 is pushed by the piston 5 away from the head portion 4 to extend the shaft 4 in axial direction. When the gap G is formed, the fastening nut 9 is rotated to come into contact again with the end surface of the cylinder 8. Relative movement between the piston 5 and the cylinder 8 is then restricted by the fastening nut 9, and the position of the lock nut 7 shown in the lower half of the FIG. 11 can be maintained after the hydraulic pressure is released. A convex nut 12 and a concave nut 13 are disposed between the clamp 2 and the cylinder 8, and a spacer 14 is disposed between the end surfaces of the piston 5 and the lock nut 7.

By using a bolt shown in FIG. 11, a large number of bolts can be securely fastened utilizing hydraulic pressure. Another prior arts of such bolts utilizing hydraulic pressure for fastening are disclosed in Japanese Laid-Open Patent Publication No. Hei 2-262971 and Japanese Laid-Open Patent Publication No. Hei 5-79302. The former includes means for creating fastening force in a turn buckle by extending the bolt with hydraulic pressure, and means for locking the fastened condition after the hydraulic pressure is released. The latter includes tension nuts connected at both ends of the bolt, and one tension nut is pulled up by a hydraulic cylinder to create prescribed fastening force, and the pulled up condition is retained by fastening a nut.

By applying bolt designs disclosed in Japanese Laid-Open Utility Model No. Sho 63-157407, Japanese Laid-Open Patent No. Hei 2-262971 or Japanese Laid-Open Patent Publication No. Hei 5-79302 for fastening objects such as flanges, a large number of bolts can be fastened simultaneously utilizing hydraulic pressure, but it is difficult to unfasten the objects by loosening the bolts. In the prior art of Japanese Laid-Open Utility Model No. Sho 63-157407 shown in FIG. 11, the gap G is formed again between the fastening nut 9 and the cylinder 8 by the application of additional hydraulic pressure in the hydraulic space 6, and the fastening nut 9 can be loosened by hand. However, the lock nut 7 is pushed strongly against the end of the piston 5, and a considerable amount of torque will be needed to loosen the lock nut 7 from the fastening shaft 4. The clamp 2 cannot be removed from the guide base 1a and the rest bar 3 without removing the lock nut 7 from the fastening shaft 4. When the fastening shaft 4 together with the combination of piston 5 and cylinder 8 as shown in FIG. 11 is applied for fastening flanges, the flanges cannot be separated without removing the lock nut 7 from the fastening shaft 4.

Fastening and unfastening operation of the bolt can be automatically done by rotating the nut with a hydraulic motor or other means. However, this method has following disadvantages:

(1) The equipment becomes expensive;
(2) Complicated and expensive hydraulic apparatus is needed;
(3) Large installation space is needed when the hydraulic apparatus is relatively large, and the installation becomes difficult due to the interference of the apparatus when the flange has a large diameter and needs a large number of bolt for fastening.

Manual fastening and unfastening operation of ordinary bolt and nut has following disadvantages:

(1) Manual operation becomes difficult when the bolt has a large diameter;
(2) Insertion and withdrawal of the bolt is difficult due to its heavy weight;
(3) Even when the clamp is manually operable, long time is needed to perform the entire operation of fastening or unfastening a large number of bolts, lowering plant operation efficiency;
(4) Fastening force of the bolt is required to be adjusted precisely for respective fastening operation by a torque wrench or other means.

The object of the present invention is to provide a fastening bolt with a simple structure with easy fastening and unfastening operation, and with no adjustment of the fastening force is required in respective fastening operation.

DISCLOSURE OF INVENTION

The fastening bolt of the present invention is for fastening an object between a head portion formed on one end of the shaft and a nut attached on the threaded portion formed around the shaft, characterized in that the fastening bolt includes a hydraulic pressure application means for applying a hydraulic pressure to extend the shaft between the head portion and the threaded portion of the bolt when the object is fastened between the head portion and the nut, and for releasing the fastened condition of the object, and the head portion is formed in a hammer shape by a removably attached cotter which extends in the direction perpendicular to the axis of the shaft.

According to the present invention of the above structure, the shaft of the fastening bolt can be extended between the head portion and the nut where the object is fastened by the application of hydraulic pressure, and when the shaft is extended, the nut can easily be loosened for releasing the fastened condition. By tightening the nut when the shaft is extended, large fastening force is obtained after the hydraulic pressure is released, and the fastening force can also be adjusted easily by the adjustment of the hydraulic pressure. More particularly, the object is fastened between the head portion and the nut attached on the threaded portion, and the shaft is extended between the head portion and the nut by the application of hydraulic pressure by the hydraulic pressure application means, and fastened condition of the object is released to become unfastened condition. In the unfastened condition, the nut can be easily rotated and can also be removed from the shaft. By tightening the nut when the shaft is extended, the object can be tightly fastened between the nut and the head portion after the hydraulic pressure is released. This fastening condition corresponds to the condition when the nut is tightened with relatively strong fastening force. The force needed to tighten the nut while the shaft is extended by the hydraulic pressure can be set to such an extent that the nut is manually rotatable, and the final fastening force can be adjusted by the hydraulic pressure.

The present invention is further characterized in that a cavity is formed within the shaft to be extended, and the fluid pressurizing means is adapted to apply and release hydraulic pressure in the cavity.

According to the invention of the above structure, the shaft can be extended by a simple construction because the shaft is extended by the application of hydraulic pressure in the cavity. More particularly, when the cavity formed within the shaft is pressurized by the fluid pressurizing means, the shaft is extended by the internal pressure in the cavity, and the shaft returns to its original length when the hydraulic pressure in the cavity is released.

Further, the head portion is formed in a hammer shape by a removably attached cotter which extends in the direction perpendicular to the axis of the shaft. Therefore, the fastening bolt can easily be withdrawn from the object by removing the cotter from the head portion. More particularly, when the cotter extending in the direction perpendicular to the axis of the shaft is attached, the head portion is prevented from passing through the bolt hole with a slightly larger inner diameter than the outside diameter of the shaft of the fastening bolt, enabling the object to be fastened. When the cotter is removed from the head portion of the fastening bolt, the shaft of the fastening bolt can easily be withdrawn through the bolt hole formed in the object, and can be easily withdrawn from the bolt hole to release the object.

The present invention is further characterized in that the means for applying pressure includes a combination of cylinder and piston, wherein the cylinder and the piston are moved apart in the axial direction of the shaft by the application of hydraulic pressure, and wherein either one of the cylinder or the piston is connected to the shaft, and the other one of the cylinder or the piston pushes the nut away from the head portion by application of the hydraulic pressure.

According to the present invention of the above structure, the combination of cylinder and piston is provided for the extension of the shaft, which is profitable for a small diameter shaft in which it is difficult to form a cavity. More particularly, the combination of cylinder and piston is provided in the fluid pressurizing means. When the hydraulic pressure is applied, the cylinder and piston are moved apart each other in the axial direction of the shaft of the fastening bolt, and either one of the cylinder or piston is connected to the shaft and the other one of the cylinder or the piston presses the nut away from the head portion, thus, the shaft can be extended by the application of hydraulic pressure to separate apart between the shaft and the nut.

Further, a bolt hole which corresponds to the shape of the fastening bolt is formed in the object, and the fastening bolt can be easily withdrawn from the object. More particularly, the head portion of the fastening bolt is formed in a hammer shape which extends in the direction perpendicular to the axis of the shaft, and the bolt hole in the object is formed as an elongated shape which corresponds to the hammer shape. The head portion and the bolt hole cross each other in the fastened condition, and the head portion is alined with the bolt hole in the unfastened condition, thus the fastening and unfastening condition can be converted easily by rotating the head portion.

The present invention is further characterized in that a collar extending in the axial direction of the shaft is provided between the fastened object and the nut.

According to the present invention of the above structure, the shaft can be extended sufficiently by a relatively low pressure because the length of the shaft is increased by the collar. More particularly, the collar extending in the axial direction of the shaft is provided between the fastened object and the nut, increasing the length of the extendable portion of the shaft, within which the fluid pressurizing means is easily mounted.

The present invention is further characterized in that the object is fastened via spherical washers.

According to the present invention of the above structure, uniform fastening force is obtained by the spherical washers. More particularly, the object is fastened via spherical washers having centering function to apply uniform fastening force around the axis of the shaft.

The present invention is further characterized in that the head portion is formed in a hammer shape having an axis extending in the direction perpendicular to the axial direction of the shaft.

According to the present invention of the above structure, a bolt hole which corresponds to the particular shape of the head portion is formed in the object, and the fastening bolt can be easily withdrawn from the object. More particularly, the head portion of the fastening bolt is formed in hammer shape which extends in the direction perpendicular to the axial direction of the shaft, and the bolt hole in the object is formed as an elongated shape which corresponds to the hammer shape. The head portion and the bolt hole cross each other in the fastened condition, and the head portion is alined with the bolt hole in the unfastened condition, thus, the fastening and unfastening condition can be converted easily by rotating the head portion.

The present invention is further characterized in that the head portion is formed by a removably attached cotter which extends in the direction perpendicular to the axial direction of the shaft.

According to the present invention of the above structure, the fastening bolt can be easily withdrawn from the object by removing the cotter form the head portion. More particularly, when the cotter is attached, the head portion of the fastening bolt is prevented from passing through the bolt hole with a slightly larger inner diameter than the shaft of the fastening bolt, enabling the object to be fastened. When the cotter is removed from the head portion of the fastening bolt, the shaft of the fastening bolt can pass the bolt hole formed in the object, and can be easily withdrawn from the bolt hole to release the object.

The present invention is further characterized in that the nut is fastened via a spacer having a non circular irregular sectional shape in a plane perpendicular to the axial direction of the shaft.

According to the present invention of the above structure, the object to be fastened has a bolt hole through which non circular spacer can pass, and the fastening bolt can be easily withdrawn from the object by aligning the direction of the non circular spacer with the bolt hole. More particularly, the nut for fastening the object with the fastening bolt is fastened via spacer having a non circular irregular sectional shape in a plane perpendicular to the axial direction of the shaft, the fastening the object and removal of the bolt from the object can be performed easily by the bolt hole having a shape that the fastening bolt together with the nut can pass when the non circular shaped spacer is oriented in the predetermined direction, and cannot pass when the spacer is oriented in another direction.

The present invention is further characterized in that the hammer shaped head portion is not formed integrally with the shaft, but is formed separately as a spacer, and another nut is disposed outside of the head portion opposite from the object for limiting the movement of the hammer shaped head portion in the axial direction of the shaft.

According to this invention of the above structure, a hole is provided in the center of the hammer shaped head portion to make the head portion freely rotatable around the shaft and enabling it to serve as a spacer, and by providing another nut threadably connected to the shaft on the outer side of the head portion, the position for limiting the movement of the hammer shaped head in the axial direction of the shaft can be easily adjusted when the fastening bolt is in the unfastened condition.

BRIEF DESCRIPTION OF DRAWINGS

FIGS. 8a and 8b are a side sectional view and a perspective view showing a nut side portion of a fastening bolt 90 in the sixth embodiment;

BEST MODE FOR CARRYING OUT THE INVENTION

Figure 1A:
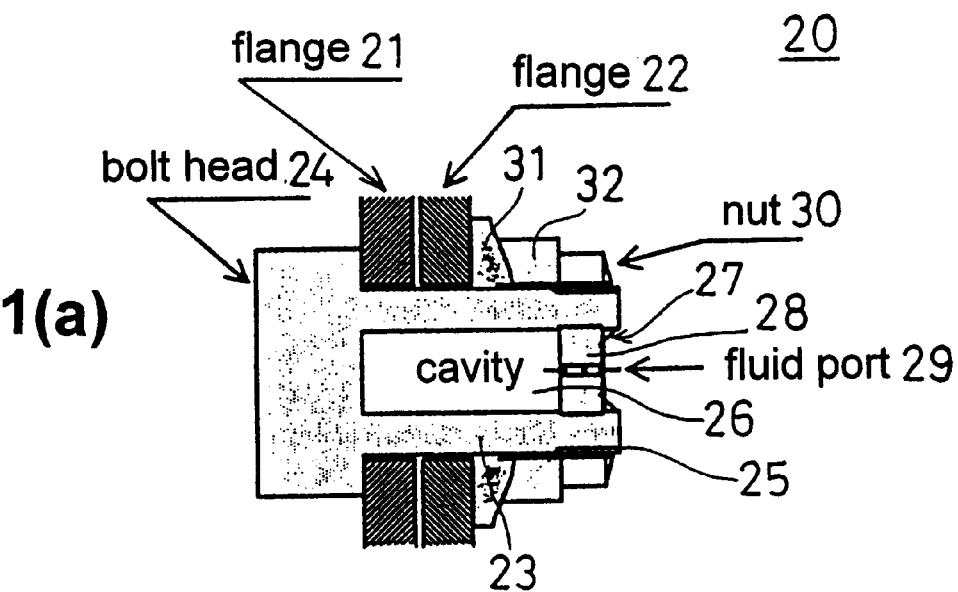
FIGS. 1a and 1b are sectional views of the first embodiment of a fastening bolt 20 in fastened condition and unfastened condition.
Figure 1B:
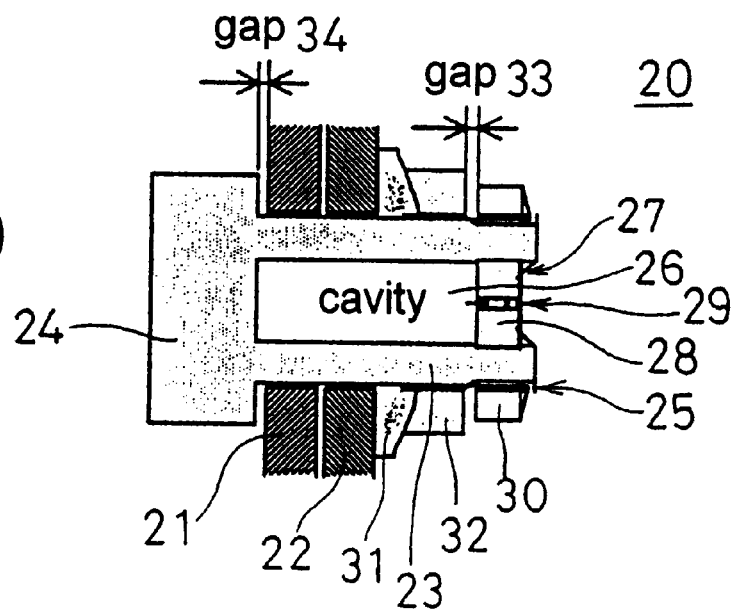

FIG. 1 shows a basic structure of a fastening bolt 20 as the first embodiment of the present invention. FIG. 1(a) shows the fastened condition, and FIG. 1(b) shows the unfastened condition. The fastening bolt 20 is used for fastening objects such as flanges 21, 22. A shaft 23 to be inserted through flanges 21, 22 has a bolt head 24 on one end. A threaded portion 25 is formed on the circumference toward the other end of the shaft 23, and a cavity 26 is formed within the shaft 23. The cavity 26 has an inner thread 27 toward the other end in the axial direction for inserting a plug 28. The plug 28 seals the cavity 26. The plug 28 has a hydraulic pressure port 29 for supplying pressure hydraulic fluid into the cavity 26.

FIG. 1(a) shows the fastening condition with no hydraulic pressure applied in the cavity 26, fastening flanges 21, 22 between the bolt head 24 and a nut 30 connected to the threaded portion 25. Spherical washers 31, 32 having a centering function are provided between flange 22 and the nut 30 to apply uniform fastening force upon the flange 22.

FIG. 1(b) shows the extended condition of the shaft 23 with the hydraulic pressure applied in the cavity 26 through the port 29. By the hydraulic pressure in the cavity 26, the shaft 23 is extended, and gaps 33, 34 which correspond to the amount of extension, are created between the nut 30 and the bolt head 24. In this condition, the fastening force by the nut 30 disappears, and the nut 30 can be easily be removed by hand from the threaded portion 25.

Furthermore, by manually tightening the nut 30 when the shaft 23 is extended by hydraulic pressure in the cavity 26 as shown in FIG. 1(b), and by releasing the hydraulic pressure in the cavity 26 to the fastened condition shown in FIG. 1(a), the flanges 21, 22 can be fastened between the head 24 and the nut 30 with greater fastening force created by the shrinkage of the shaft 23. In the condition shown in FIG. 1(b), the fastening force can be adjusted by the hydraulic pressure in the cavity 26. When the hydraulic pressure is constant, the fastening force can be determined by the sum of the width of the gap 33 between the spherical washers 31, 32 and the nut 30, and the gap 34 between the flange 21 and the bolt head 24. In this case, the fastening force is increased when the sum of the gaps is smaller.

Figure 2:
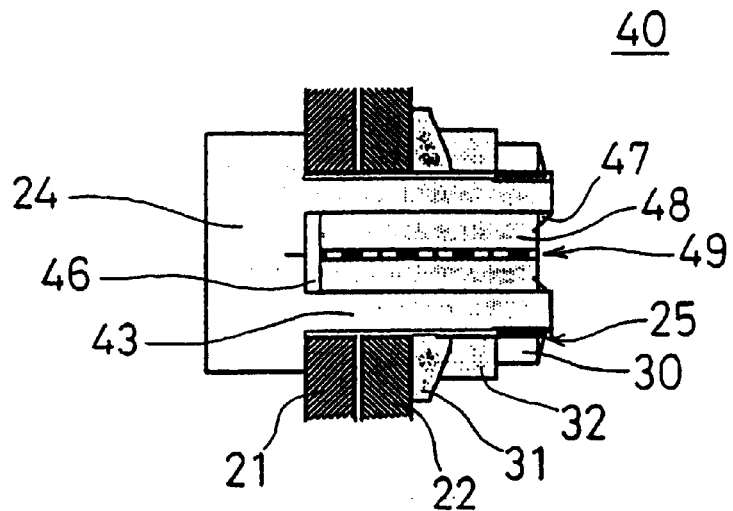
FIG. 2 is a sectional view of the second embodiment of a fastening bolt 40 in fastened condition.

FIG. 2 shows a fastening bolt 40 as a second embodiment of the present invention. In drawings following FIG. 2, like reference numerals are used to designate similar parts to avoid repeated explanation. A cavity 46 formed in the shaft 43 in this embodiment is smaller in volume compared to the cavity 26 in the embodiment shown in FIG. 1. In the embodiment shown in FIG. 1, a large quantity of hydraulic fluid always exists in the fastening bolt 20 because of a large volume of the cavity 26. The present embodiment has an advantage that the amount of hydraulic fluid can be reduced because of a small volume of the cavity 46. A large volume of hydraulic fluid increases the influence of thermal expansion of hydraulic fluid. When the volume of hydraulic fluid is smaller, the pressure in the cavity 46 drops drastically with the small extension of the shaft 43. Therefore, the influence of the thermal expansion of the hydraulic fluid in the cavity 46 upon the amount of extension can be minimized.

Figure 3:
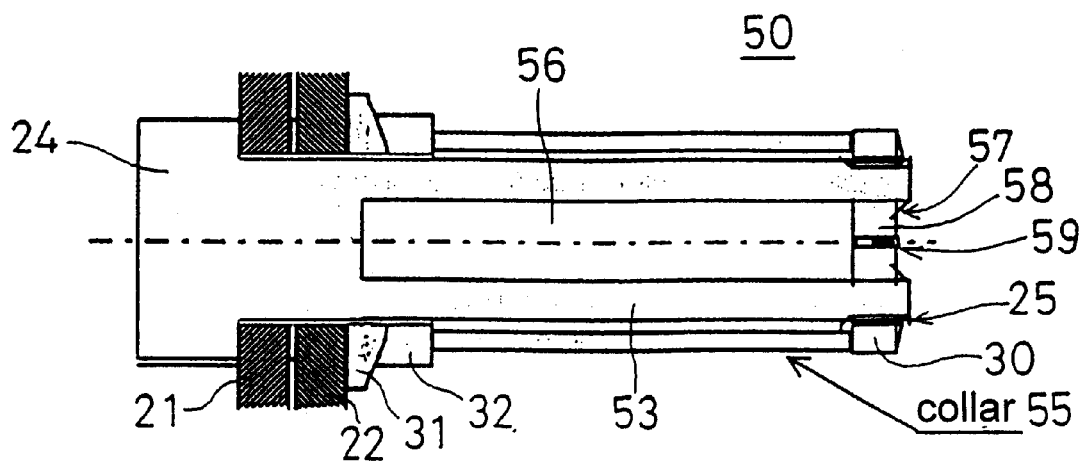
FIG. 3 is a sectional view of the third embodiment of a fastening bolt 50 in fastened condition.

FIG. 3 shows a fastening bolt 50 as a third embodiment of the present invention. In this embodiment, the length of the shaft 53 as well as the length of the cavity 56 is increased in the axial direction of the shaft. With this structure, the amount of extension of the shaft 53 is increased with respect to the pressure of hydraulic fluid introduced through the port 59 in the plug 58 attached with inner thread 57 at the end of the cavity 56. A cylindrical collar 55 is inserted between the spherical washer 32 and the nut 30 for adjusting the fastening length.

FIG. 4 shows a fastening bolt 60 as a fourth embodiment of the present invention. Unlike embodiments 1 through 3, the bolt 61 in this embodiment has no cavity formed in the shaft 63. The shaft 63 has a bolt head 24 formed on one end and a threaded portion 65 formed on the circumference toward the other end. A protruding portion 66 is provided on the shaft 63 on the position toward the other side from the portion passing through the flanges 21, 22. The other end side of the protruding portion 66 of the shaft 63 is inserted in a combination of a cylinder 67 and piston 68. The cylinder 67 has a fluid inlet port 69 which communicates with the abutted portion of the cylinder 67 and piston 68. A nut 70 is threadably connected to the threaded portion 65. Spherical washers 71, 72 and a collar 75 are disposed between the nut 70 and the flange 22. The piston 68 is slidable in the cylinder 67 in the axial direction of the bolt 61.

Figure 4A:
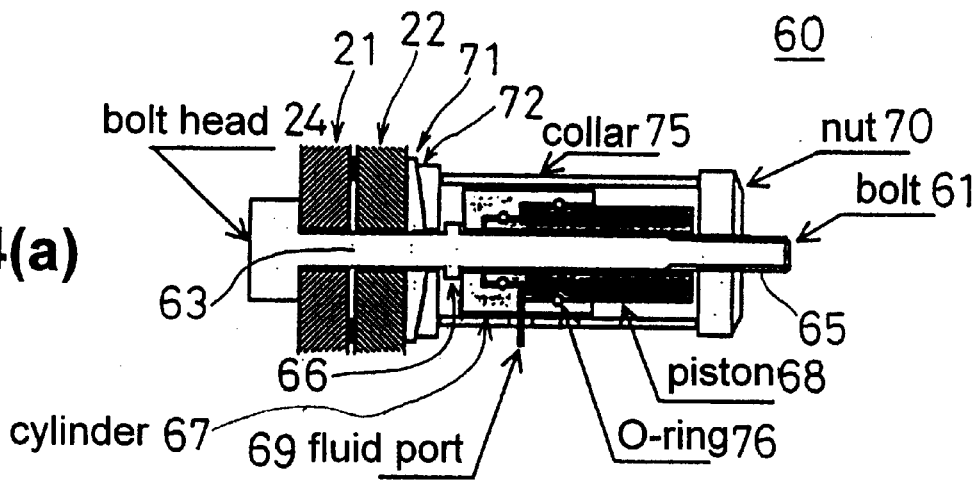
FIGS. 4a and 4b are sectional views of the fourth embodiment of a fastening bolt 60 in fastened condition and unfastened condition.
Figure 4B:
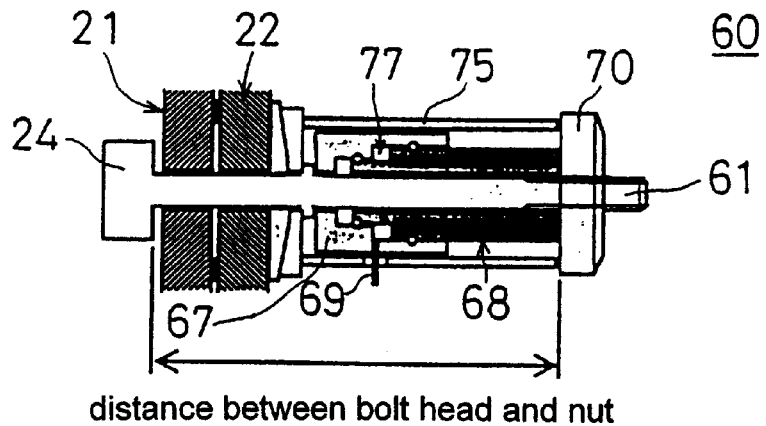

FIG. 4(a) shows the fastened condition with no hydraulic fluid supplied from the fluid port 69, and FIG. 4(b) shows the unfastened condition with the hydraulic fluid supplied from the fluid port 69 to separate abutted portion of the cylinder 67 and the piston 68 to form a pressurizing space 77. The formation of the pressurizing space 77 increases the length of the shaft 63 between the protruding portion 66 and the nut 70, and also increases the length between the bolt head 24 and nut 70, creating gaps between the bolt head 24 and the flange 21 or between the collar 75 and the nut 70.

As shown in FIG. 4(a), the flanges 21, 22 are fastened together between the bolt head 24 and the nut 70 via the spherical washers 71, 72 and the cylindrical collar 75. The protruding portion 66 of the bolt 61 can be formed by such as welding a nut. Combination of cylinder 67 and piston 68 is located between the protruding portion 66 and the nut 70. When hydraulic pressure is applied to the fluid port 69, shaft 63 of the bolt 61 is extended by the movement of the piston 68 which moves apart from the cylinder 67 to press the nut 70.

As shown in FIG. 4(b), when hydraulic fluid is supplied from the fluid port 69, the shaft 63 of the bolt 61 is extended by the hydraulic pressure, as a result, the distance between the bolt head 24 and the nut 70 exceeds the combined thickness of the flanges 21, 22, the spherical washers 71, 72 and the collar 75, creating gaps at abutted portions such as between the bolt head 24 and the flange 21.

By releasing the hydraulic pressure after the distance between the bolt head 24 and the nut 70 is determined by adjusting the nut 70 during the extended condition shown in FIG. 4(b), the flanges 21, 22 can be fastened by the contraction of the bolt 61. Sliding portion between the cylinder 67 and the piston 68 is sealed by an O-ring 76 to prevent leakage of hydraulic fluid. After the position of the nut 70 has been set, rotation of the nut 70 is locked, hydraulic pressure is applied through a flexible hose or the like. The length of the shaft 63 is increased, when the amount of extension of the bolt 61 is not sufficient.

Figure 5A:
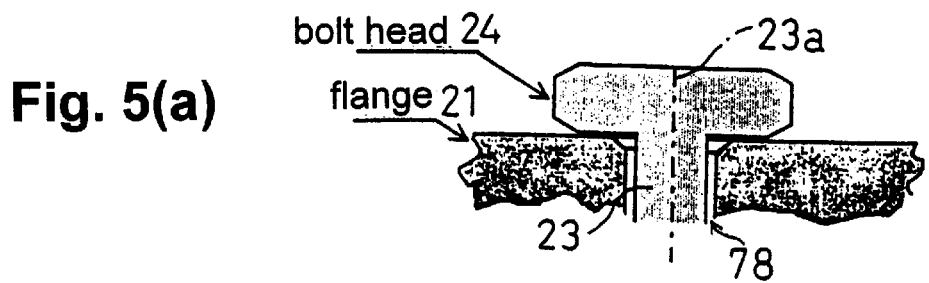
FIGS. 5a and 5b show a side sectional view and a plan view showing the relationship between the direction of a bolt head 24 and the direction of a bolt hole 78 formed in a flange 21 in the fastened condition of the embodiment shown in FIG. 1.
Figure 5B:
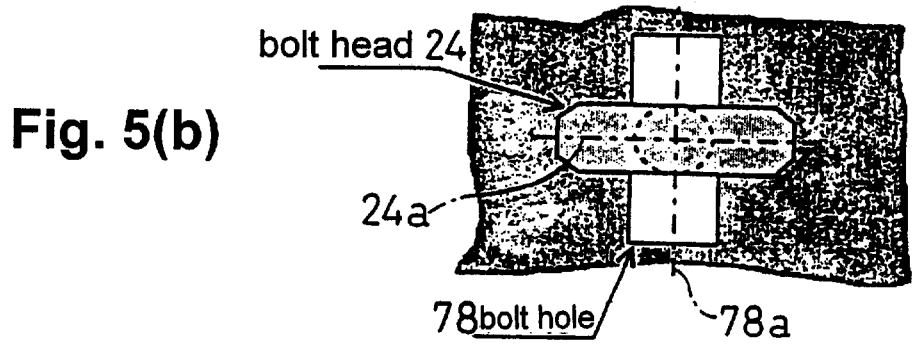

FIG. 5 shows the fastening condition and function of the bolt head 24 shown in the first embodiment. FIG. 5(a) shows a side view and FIG. 5(b) shows a plan view. The bolt head 24 has a hammer shape extending in the direction 24a perpendicular to the axis 23a of the shaft 23. The flange 21 has a rectangular bolt hole 78 formed to correspond the outer shape of the bolt head 24. When the axis 24a of the bolt head 24 and the axis 78a of the sectional shape of the bolt hole 78 cross each other at right angle as shown in FIG. 5(b), the bolt head 24 cannot pass through the bolt hole 78, and the bottom surface of the bolt head 24 is pressed against the upper surface of the flange 21.

Figure 6A:
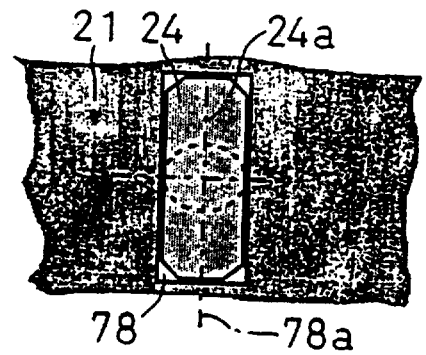
FIGS. 6a, 6b, and 6c show a plan view and a side sectional view showing the relationship between the direction of a bolt head 24 of a fastening bolt and the direction of a bolt hole 78 formed in a flange 21 in the unfastened condition of the embodiment shown in FIG. 1.
Figure 6B:
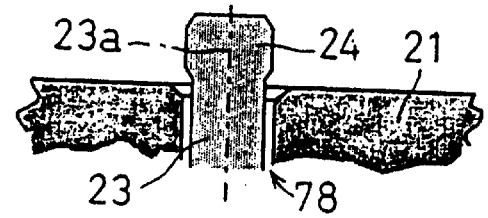
Figure 6C:
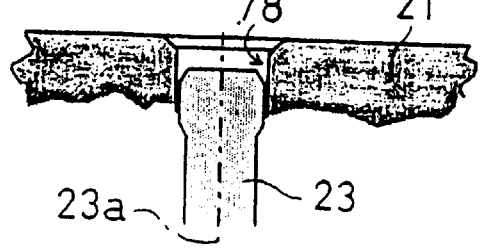

FIG. 6 shows the condition in which the bolt head 24 can pass through the bolt hole 78 by aligning the axis 24a of the bolt head 24 with the axis 78a of the bolt hole 78 formed in the flange 21. FIG. 6(a) is a plan view showing that the outer shape the bolt head 24 is accommodated within the rectangular sectional shape of the bolt hole 78, allowing the bolt head 24 shown in the side views in FIG. 6(b) to be withdrawn through the bolt hole 78, to the condition shown in FIG. 6(c).

In the embodiments shown in FIGS. 1 through 4, the bolt head 24 can be easily withdrawn through the bolt holes 78 formed in flanges 21 and 22, by rotating the bolt head 24 from the direction shown in FIG. 5 to the direction shown in FIG. 6 during the unfastened condition when the bolt is extended as shown in FIG. 1(b) or FIG. 4(b).

Figure 7B:
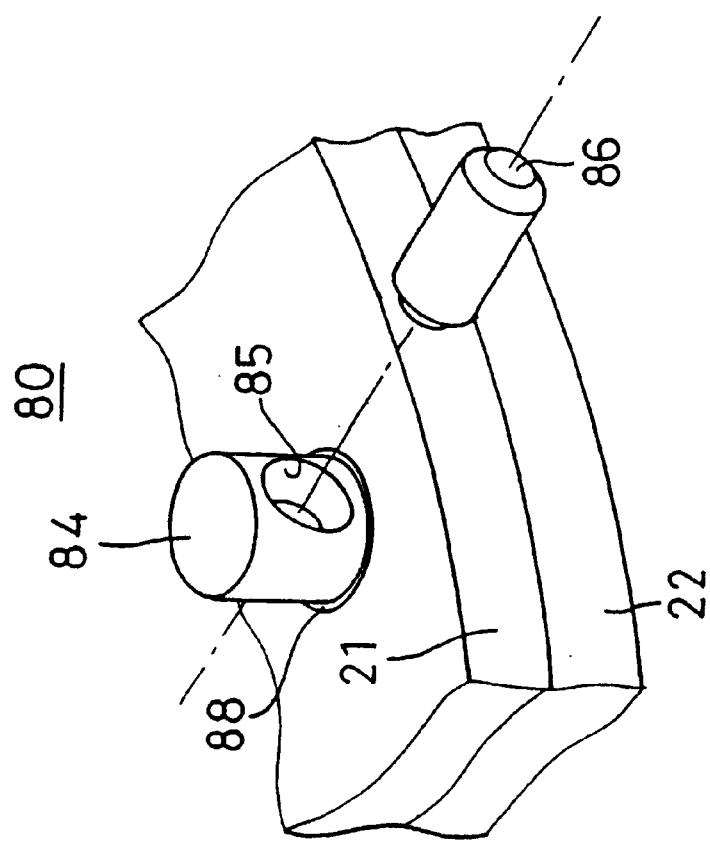
FIGS. 7a and 7b show a side sectional view and a perspective view showing a portion of a fastening bolt 80 in the fifth embodiment.
Figure 7A:
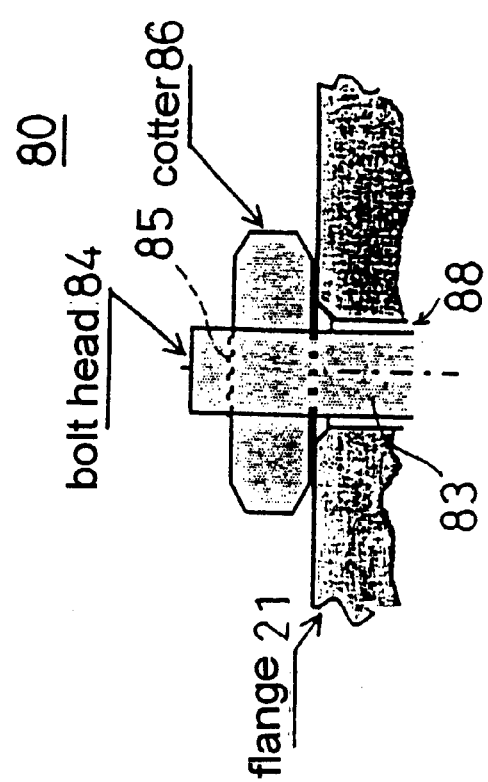

FIG. 7 partially shows a fastening bolt 80 as a fifth embodiment of the present invention. As shown in FIG. 7(a), the bolt head 84 of the fastening bolt 80 has a cotter hole 85 in which a cotter 86 is removably attached. A bolt hole 88 is formed in the fastened object such as flange 21, 22 through which the shaft 83 of the fastening bolt 80 can pass. When the cotter 86 is attached, the fastening bolt 80 cannot pass through the bolt hole 88. By removing the cotter 86 from the cotter hole 85 as shown in FIG. 7(b), the bolt head 84 can pass through the bolt hole 88. Therefore, the fastening bolt 80 can be removed from the fastened object by removing the cotter 86. The removal of the cotter 86 in this embodiment, can easily be performed in the same manner during the unfastened condition when the shaft is extended such as shown in FIG. 1(b). In the fastened condition of the shaft as shown in FIG. 1(a), the side surface of the cotter 86 is pressed strongly against the surface of the flange 21, and the removal of the cotter 86 is difficult.

FIG. 8 partially shows a fastening bolt 90 as a sixth embodiment of the present invention. A bolt 91 in this embodiment is fastened via a hammer forming elongated spacer 97 by a nut 96 connected to the threaded portion 95 formed toward the end of a shaft 93. Consequently, a bolt with an ordinary head shape can be used as the bolt 91. The hammer forming elongated spacer 97 has an elongated shape extending in the direction parallel to the contact surfaces of the flanges 21, 22, and bolt holes 98, 99 formed in the flanges 21, 22 correspond to the shape of the elongated spacer 97. Consequently, the bolt 91 including the elongated spacer 97 and the nut 96 can be removed from the flanges 21, 22 by aligning the direction of bolt holes 98, 99 with the direction of the elongated spacer 97 when the nut 96 is sized to pass through the bolt holes 98, 99.

To unfasten flanges by removing bolt 91, pressure is applied at first to extend the bolt 91 to loosen the contact surface between the elongated spacer 97 and the flange 21. The pressure application to the bolt is performed in the same manner as in any embodiments shown in FIGS. 1 through 4. When contact surface between the elongated spacer 97 and flange 22 is loosened, the elongated spacer 97 is rotated in 90 degrees to the direction that the nut 96 and the spacer 97 can pass through the bolt holes 98, 99. Then the nut 96 and the elongated spacer 97 can pass the bolt hole 98, by widening the gap between the flanges 21, 22.

To fasten the flanges together, the nut 96 is sufficiently loosened at first, the bolt 91 is passed through the bolt holes 98, 99 together with the nut 96 and the elongated spacer 97, and the spacer 97 is rotated in the direction shown in FIG. 8. Then, the hydraulic pressure is applied to extend the bolt 91, and the nut 96 is tightened manually while the bolt 91 is extended, until the nut 96, the elongated spacer 97 and the flange 21 come into contact with each other. Then by releasing the hydraulic pressure to 0, the flanges 21, 22 are fastened together by the contraction of the bolt 91. When applied hydraulic pressure is constant, fastening force of all bolts can be made substantially constant, irrespective of slight roughness that may exist on the surface of the flanges 21, 22.

Such structure as in this embodiment can also be applied on the side of head portion. That is, the hammer shaped head is not formed integrally with the shaft but is formed separately as a spacer, and another nut is disposed on the other side of the fastened object to limit the axial position of the hammer shaped head. By providing a hole in the center of the hammer shaped head, which functions as a spacer separated from the shaft, the axial position of the hammer shaped head can be adjusted easily by another nut connected to the shaft on the outer side of the head portion while the fastening bolt is extended.

Figure 9:
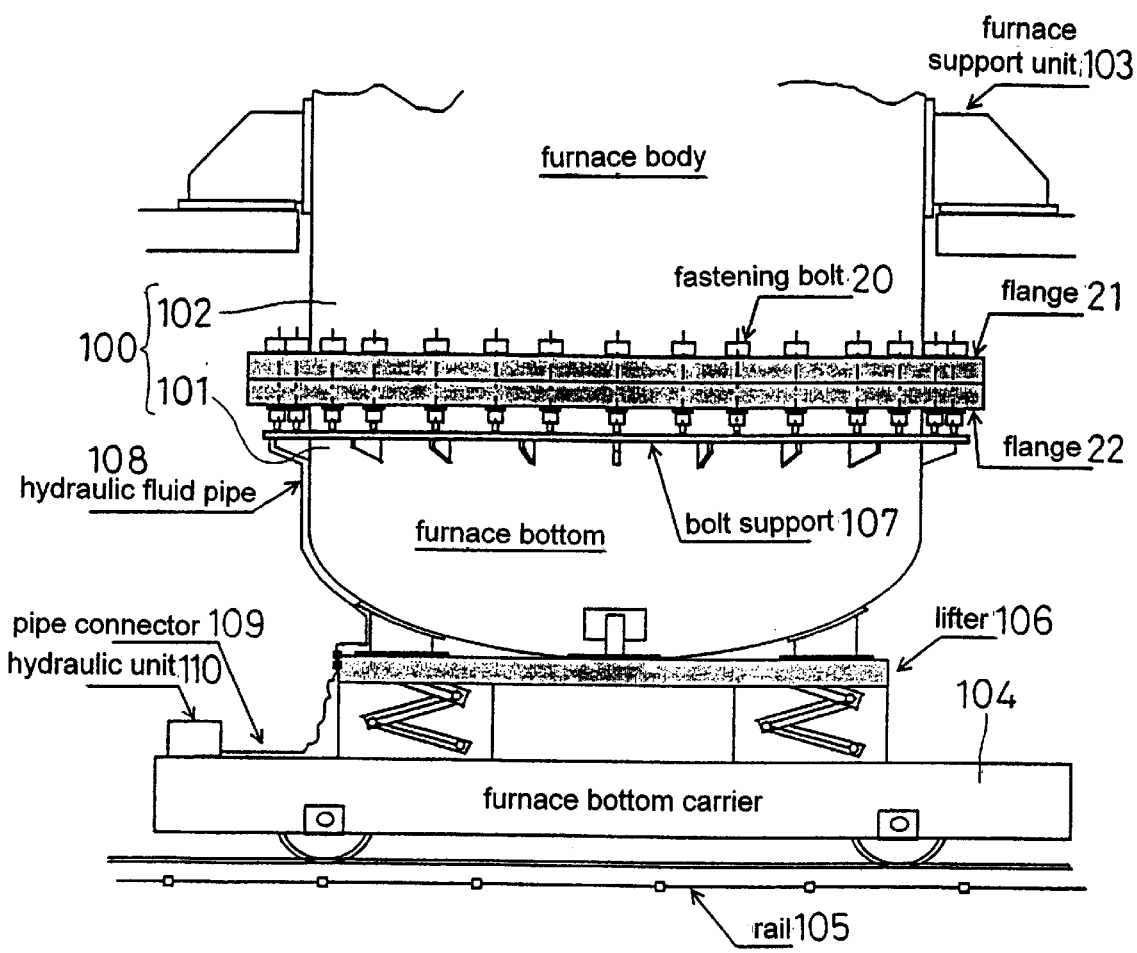
FIG. 9 is a side view of flange fastening apparatus using fastening bolts 20 in the embodiment shown in FIG. 1 when bolts 20 are in fastened condition.

FIG. 9 shows the configuration of a flange fastening equipment using fastening bolts 20 in the embodiment shown in FIG. 1. A furnace 100 is, for example, a smelting reduction furnace for making molten iron under the smelting reduction process, and the furnace is divided into a furnace bottom 101 and a furnace body 102. Inner surface of the furnace bottom 101 is covered with a firebrick liner which needs repairing due to wearing caused during the operation. For the repairing of the liner, the furnace bottom 101 is separated from the furnace body 102. By preparing more than one furnace bottom 101 for one furnace body 102, drop of plant efficiency can be minimized because the operation of the furnace 100 can be restarted after the furnace bottom 101 is replaced, and repairing of the liner of the furnace bottom 101 can be performed while the furnace 100 with another furnace bottom 101 is in operation. By the replaceable bottom 101, the smelting reduction plant can be constructed at lower cost compared to the plant in which the replacement of the entire furnace 100 is necessary.

The furnace body 102 and furnace bottom 101 are provided with flanges 21, 22 respectively, and by connecting the flanges 21, 22 with fastening bolts 20 the furnace 100 becomes operable. The furnace 100 is supported by a furnace support unit 103, and is also tiltable on the axis of this furnace support unit 103.

A furnace bottom carrier 104 running on rails 105 moves into the location below the furnace 100 for the replacement of the furnace bottom 101. A lifter 106 is mounted on the furnace bottom carrier 104. The furnace bottom 101 is held on the lifter 106 which is raised to connect the furnace bottom 101 to the furnace body 102, or lowered to remove the furnace bottom 101 from the furnace body 102. The furnace bottom 101 has a bolt support 107 below the flange 22 for supporting the lower end of respective fastening bolt 20. Because lower end of fastening bolt 20 is held by the bolt support 107, a gap is created between the upper surface of the flange 21 and the lower surface of the bolt head of each fastening bolt 20 when it is extended by the hydraulic pressure. In the extended condition, the bolt head of respective fastening bolts 20 is freely rotatable so that the direction of the bolt heads can be changed easily from the fastened condition shown in FIG. 5 to the unfastened condition shown in FIG. 6.

Hydraulic liquid pipe 108 is connected to each fastening bolt 20 for supplying and discharging hydraulic liquid. A hydraulic unit 110 is connected to the pipe 108 via a pipe connector 109. A hydraulic fluid pump and a hydraulic fluid tank are stored in the hydraulic unit 110.

Figure 10:
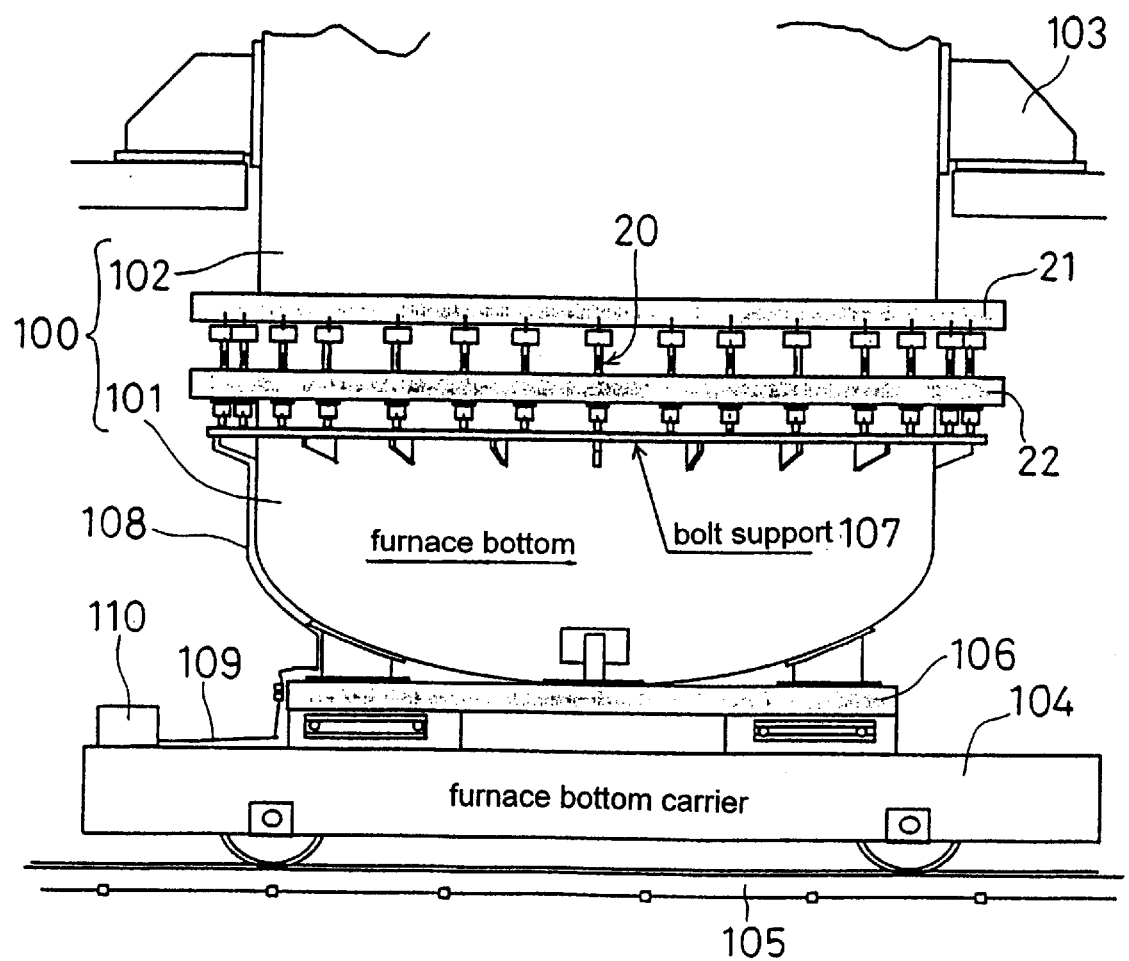
FIG. 10 is a side view of the flange fastening apparatus in FIG. 9, when fastening bolts 20 are in unfastened condition and flanges are separated.
Figure 11:
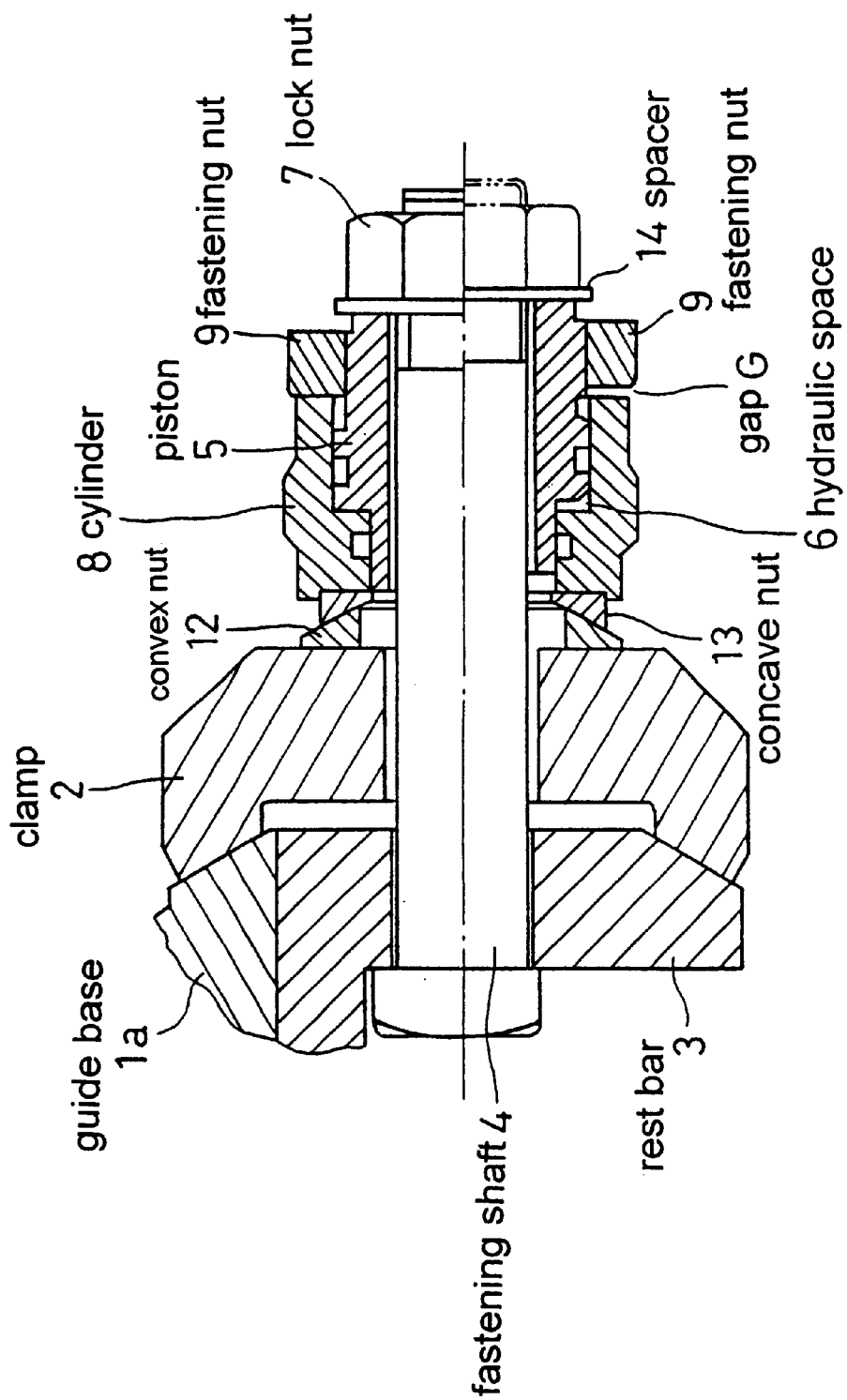
FIG. 11 is a sectional view of a fastening bolt according to the prior art.

FIG. 10 shows the released condition in which all fastening bolts 20 are withdrawn from the flange 21, and the furnace bottom 101 together with all fastening bolts 20, flange 22 and bolt support 107 are lowered by lowering the lifter 106, after the bolt heads of the fastening bolts 20 are aligned with the orientation of the bolt holes formed in the flange 21. When bolt heads of the fastening bolts 20 are lowered below the upper flange 21, the furnace bottom carrier 104 running along the rails 105 carries the furnace bottom 110 away from the location just below the furnace body 102. As described above, new furnace bottom 101 with firebrick inner lining already repaired at another place is moved into the location just below the furnace body 102 as shown in FIG. 10. By providing a set of flange 22, bolt support 107 and hydraulic pipes 108 for all bolts with the furnace bottom 101, the furnace can continue its operation using another furnace bottom 101 while one furnace bottom 101 is being repaired. The new furnace bottom 101 is raised by the lifter 106 from the position shown in FIG. 10 and is connected to the furnace body 102. During the raising of the furnace bottom 101, the bolt heads of the fastening bolts 20 pass through the bolt holes having specific orientation formed in the upper flange 21. When the flanges 21 and 22 are connected by raising the lifter 106, the hydraulic fluid is supplied from the hydraulic unit 110 to extend each fastening bolts 20. Then, the heads of the fastening bolts 20 are turned 90 degrees as shown in FIG. 5 in the direction that the head can not pass through the bolt holes formed in the upper flange 21. After the direction of the heads of all fastening bolts has been changed, the hydraulic pressure to the fastening bolts 20 is released and the hydraulic fluid is discharged by actuating the hydraulic unit 110, to bring each fastening bolts 20 into fastened condition.

As described earlier, the flanges 21 and 22 can be fastened uniformly because the fastening force of the fastening bolts 20 can be adjusted by the gaps formed while the fastening bolts 20 are extended, and all fastening bolts 20 can be fastened simultaneously after the hydraulic pressure is released. It is also possible to divide the fastening bolts 20 into groups so that fastening and unfastening can be performed in groups. The fastening surfaces of the flanges 21 and 22 shown in FIGS. 9 and 10 are disposed horizontally. However, the fastening bolt of the present invention is also applicable to horizontal connection of vertical fastening surfaces, or tilted connection of slanted fastening surfaces. Moreover, the fastening bolts of the present invention is not limited to the fastening of flanges but also applicable for fastening a variety of objects by a combination of bolts and nuts.

In the embodiment shown in FIGS. 9 and 10, the fastening bolts are positioned on the lower flange 22 side when flanges are opened. However, the fastening bolts can also be positioned on the upper flange 21 side by reversing position of each bolt.

INDUSTRIAL APPLICABILITY

Fasting bolt according to the present invention has a structure as described above, can fasten and unfasten with a simple structure, and the adjustment of the fastening force is not needed for respective fasting operation.

What is claimed is:

1. A fastening bolt for fastening an object between a head portion formed on one end of the shaft and a nut attached on the threaded portion formed around the shaft;

characterized in that said fastening bolt includes a hydraulic pressure application means for applying hydraulic pressure to extend the shaft between said head portion and said threaded portion while said object is fastened between said head portion and said nut, and for releasing a fastened condition of said object, and in that said head portion is formed in a hammer shape by a removably attached cotter which extends in the direction perpendicular to the axis of said shaft, and wherein a collar extending in an axial direction of said shaft is disposed between said object and said nut.

2. The fastening bolt according to claim 1, wherein a cavity is formed within said shaft to be extended, said hydraulic pressure application means is adapted to apply and to release hydraulic pressure in said cavity.

3. The fastening bolt according to claim 1, wherein a collar extending in axial direction of said shaft is disposed between said object and said nut.

4. A fastening bolt for fastening an object between a head portion formed on one end of the shaft and a nut attached on the threaded portion formed around the shaft, characterized in that said fastening bolt includes a hydraulic pressure application means for applying a hydraulic pressure to extend the shaft between said head portion and said threaded portion while said object is fastened between said head portion and said nut, and for releasing a fastened condition of said object, in that said hydraulic pressure application means includes a combination of cylinder and piston, said cylinder and said piston are moved apart in the axial direction of said shaft when the hydraulic pressure is applied, wherein either one of said cylinder or said piston is connected to said shaft; and the other one of said cylinder or said piston pushes said nut to move apart from said head portion when the hydraulic pressure is applied, and in that said head portion has a hammer shape which extends in the direction perpendicular to the axis of the shaft or is formed in hammer shape by a removably attached cotter, and wherein a collar extending in an axial direction of said shaft is disposed between said object and said nut.

5. The fastening bolt according to claim 4 wherein said object is fastened via spherical washers disposed between the object and the nut.

6. The fastening bolt according to claim 4, wherein said nut is fastened via a spacer having a non circular irregular sectional shape in a plane perpendicular to the axial direction of said shaft.

7. The fastening bolt according to claim 4, wherein said hammer shaped head portion is not integrally formed with said shaft, but is formed separately as a spacer, and another nut is disposed outside of said head portion on an opposite side of said object for limiting an axial position of the hammer shaped head portion.

8. A fastening bolt for fastening an object between a head portion formed on one end of the shaft and a nut attached on a threaded portion formed around the shaft, characterized in that said fastening bolt includes a hydraulic pressure application means for applying hydraulic pressure to extend the shaft between said head portion and said threaded portion while said object is fastened between said head portion and said nut, and for releasing fastened condition of said object, wherein said head portion is formed in a hammer shape by a removably attached cotter which extends in the direction perpendicular to the axis of said shaft, and wherein said object is fastened via spherical washers disposed between the object and the nut.

9. A fastening bolt for fastening an object between a head portion formed on one end of the shaft and a nut attached on a threaded portion formed around the shaft, wherein said nut is fastened via a spacer having a non circular irregular sectional shape in a plane perpendicular to the axial direction of said shaft;

characterized in that said fastening bolt includes a hydraulic pressure application means for applying hydraulic pressure to extend the shaft between said head portion and said threaded portion while said object is fastened between said head portion and said nut, and for releasing fastened condition of said object, and in that said head portion is formed in a hammer shape by a removably attached cotter which extends in a direction perpendicular to the axis of said shaft.

10. A fastening bolt for fastening an object between a head portion formed on one end of the shaft and a nut attached on a threaded portion formed around the shaft, characterized in that said fastening bolt includes a hydraulic pressure application means for applying hydraulic pressure to extend the shaft between said head portion and said threaded portion while said object is fastened between said head portion and said nut, and for releasing a fastened condition of said object, and in that said head portion is formed in a hammer shape by a removably attached cotter which extends in the direction perpendicular to the axis of said shaft, wherein said hammer shaped head portion is not integrally formed with said shaft, but is formed separately as a spacer, and another nut is disposed outside of said head portion on an opposite side of said object for limiting an axial position of the hammer shaped head portion.

* * * * *